UNITED STATES PATENT OFFICE.

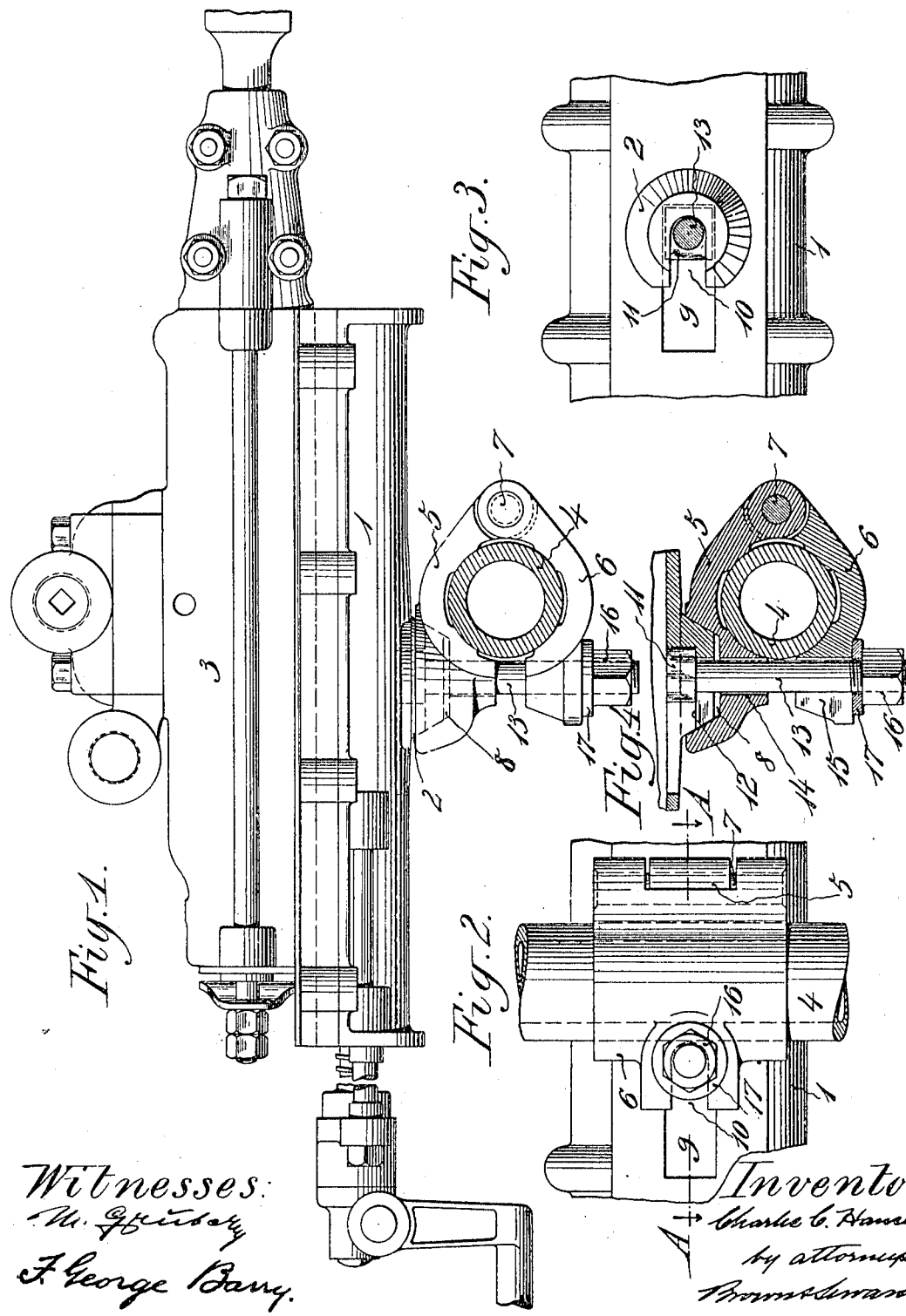

CHARLES C. HANSEN, OF EASTON, PENNSYLVANIA, ASSIGNOR TO INGERSOLL-RAND COMPANY, OF NEW YORK, N. Y., A CORPORATION OF NEW JERSEY.

MOUNTING FOR DRILLS.

949,427.  Specification of Letters Patent.  Patented Feb. 15, 1910.

Application filed September 2, 1908. Serial No. 451,441.

*To all whom it may concern:*

Be it known that I, CHARLES C. HANSEN, a citizen of the United States, and resident of Easton, in the county of Northampton and State of Pennsylvania, have invented a new and useful Improvement in Mountings for Drills, of which the following is a specification.

The object of this invention is to provide certain improvements in the construction, form and arrangement of the several parts of a mounting for drills whereby the drill may be adjustably secured to its clamp and the clamp to its support by a single means, such, for instance, as a bolt.

A practical embodiment of my invention is represented in the accompanying drawings, in which—

Figure 1 represents a rock drill in side elevation secured to the clamp and the clamp secured to a suitable support, said support being shown in transverse section, Fig. 2 is a detail view taken at right angles to Fig. 1, Fig. 3 is a detail section looking toward the drill shell with the clamp removed, the bolt being shown in section, and Fig. 4 is a section taken in the plane of the line A—A of Fig. 2, looking in the direction of the arrows.

I have chosen to show and describe my improved mounting in connection with a rock drill. The drill is denoted as a whole by 3 and its supporting device, viz; the drill shell, is denoted by 1. This shell is provided with a cone 2 for rotary adjustment of the drill on its mounting. The drill mounting consists in a clamp comprising members 5 and 6 hinged together at 7 and fitted to embrace a suitable support 4 for instance as a supporting column or its arm. The member 5 of the clamp is provided with a recess 8 for the reception of the shell cone 2 so as to permit the shell and drill carried thereby to have a rotary adjustment with respect to the clamp.

The single means which I have shown for securing the drill shell to the clamp and the clamp to the support in the desired adjustments, is constructed and arranged as follows:—The drill shell 1 is provided with an elongated slot through its back having an enlarged portion 9 exterior to the cone 2 and a reduced portion 10 leading into the cone. The enlarged portion 9 is fitted to receive therethrough the head 11 of the locking bolt and the reduced portion 10 of the slot provides shoulders 12 for engaging the head 11 of the bolt when the bolt is inserted into its position so as to project from the center of the shell cone 2. The shank 13 of this bolt passes through a hole 14 in the member 5 of the clamp centrally with respect to the recess 8 and also through an open side hole 15 in the member 6 of the clamp. The screw threaded end of the bolt is provided with a nut 16, which nut when screwed home serves to draw the shell cone 2 snugly into its recess 8 in the member 5 of the clamp for securing the drill shell to the clamp and also serves to draw the two members 5 and 6 of the clamp into snug engagement with the support 4 for securing the clamp to the said support. A suitable washer 17 may be interposed between the nut 16 and the member 6 of the clamp if so desired.

To remove the clamp from its support, the nut 16 may be unscrewed sufficiently to permit the release of the member 6 of the clamp therefrom.

To release the drill shell from the clamp, the nut 16 may be unscrewed sufficiently to permit the removal of the drill shell cone from its recess 8, thus permitting the disengagement of the shell from the head of the bolt by a longitudinal movement with respect thereto, until the head of the bolt is brought into alinement with the enlarged portion 9 of the elongated slot in the drill shell.

It will be seen from the above description that a very simple device is provided for permitting the rotary adjustment of the clamp with respect to its support and the rotary adjustment of the drill with respect to the clamp, the parts being secured in their desired adjustments by the tightening up of the single bolt.

While I have shown a drill mounting in connection with a rock drill, it is to be understood that it may be used in connection with other drills, if so desired.

What I claim is:—

1. In a mounting for drills, a drill supporting device having a cone, a suitable support, a clamp arranged to embrace the support and provided with a recess for receiving said cone and a bolt for securing the drill supporting device to the clamp and the clamp to the support in the desired adjustments, the said cone being provided with a central hole through which the bolt is adapted to pass and with an opening leading from the central hole through the side of the cone for permitting the cone to move laterally into position with respect to the bolt without removing the bolt from its position.

2. In a mounting for drills, a drill shell having a cone, a suitable support, a clamp arranged to embrace the support and provided with a recess for receiving said shell cone, and a bolt for securing the drill shell to the clamp and the clamp to the support in the desired adjustments, the said shell cone being provided with a central opening for receiving the bolt and with an opening leading from the central opening to the side wall of the cone, the latter opening being of a width equal to the body of the bolt and less than the head of the bolt and the shell being provided with an opening corresponding to the opening through the wall of the cone but having a width equal to the width of the head of the bolt, whereby the shell and its cone may be slid laterally with respect to the bolt and removed from the bolt without disturbing the bolt.

In testimony, that I claim the foregoing as my invention, I have signed my name in presence of two witnesses, this twenty fourth day of August 1908.

CHARLES C. HANSEN.

Witnesses:
ARTHUR J. SHIMER,
HERBERT S. YOUNG.